United States Patent
Genduso et al.

(10) Patent No.: US 6,260,118 B1
(45) Date of Patent: Jul. 10, 2001

(54) SNOOPING A VARIABLE NUMBER OF CACHE ADDRESSES IN A MULTIPLE PROCESSOR SYSTEM BY A SINGLE SNOOP REQUEST

(75) Inventors: Thomas B. Genduso, Apex; Wan L. Leung, Raleigh, both of NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/124,269

(22) Filed: Jul. 29, 1998

Related U.S. Application Data

(63) Continuation of application No. 08/856,273, filed on May 14, 1997, now Pat. No. 5,900,017.

(51) Int. Cl.[7] .............................. G06F 12/00; G06F 13/00
(52) U.S. Cl. .................... 711/146; 711/120; 711/124; 711/138; 711/141; 711/154
(58) Field of Search .................. 711/3, 118, 119, 711/124, 130, 138, 139, 141, 146, 154

(56) References Cited

U.S. PATENT DOCUMENTS

| | | | |
|---|---|---|---|
| 5,335,335 | * 8/1994 | Jackson et al. | 711/121 |
| 5,339,399 | * 8/1994 | Lee et al. | 711/146 |
| 5,506,971 | * 4/1996 | Gullette et al. | 710/116 |
| 5,551,006 | * 8/1996 | Kulkarni | 711/146 |
| 5,557,769 | * 9/1996 | Bailey et al. | 711/146 |
| 5,572,701 | * 11/1996 | Ishida et al. | 711/146 |
| 5,588,131 | * 12/1996 | Borrill | 711/146 |
| 5,652,859 | * 7/1997 | Mulla et al. | 711/146 |
| 5,659,710 | * 8/1997 | Sherman et al. | 711/146 |
| 5,673,414 | * 9/1997 | Amini et al. | 711/146 |
| 5,704,058 | * 12/1997 | Derrick et al. | 711/168 |
| 5,706,464 | * 1/1998 | Moore et al. | 711/122 |
| 5,708,792 | * 1/1998 | Hayes et al. | 711/108 |
| 5,715,428 | * 2/1998 | Wang et al. | 711/141 |

* cited by examiner

*Primary Examiner*—Tuan V. Thai
(74) *Attorney, Agent, or Firm*—J Bruce Schelkopf

(57) ABSTRACT

Bus interface units interposed between a multiple processor bus and individually coupled to the respective processors in a complex incorporating a multitude of processors, where each bus interface unit includes block snoop control registers responsive to signals from a system memory controller including enhanced function supportive of I/O devices with and without block snooping compatibility. The BIU provides functionality for the bus of the multiple processors to be processor independent. This architecture reduces the number of snoop cycles which must access the processor bus, thereby effectively increasing the available processor bus bandwidth. This in turn effectively increases overall system performance.

6 Claims, 3 Drawing Sheets

SNOOPING A VARIABLE NUMBER OF CACHE ADDRESSES IN A MULTIPLE PROCESSOR SYSTEM BY A SINGLE SNOOP REQUEST

This application is a continuation of Ser. No. 08/856,273 filed May 14, 1997 now U.S. Pat. No. 5,900,017.

COPYRIGHT NOTICE

1997© Copyright, International Business Machines Corporation, all rights reserved.

A portion of the Disclosure of this patent document contains material which is subject to copyright protection. The copyright owner has no objection to facsimile reproduction by anyone of the patent document or the patent disclosure as it appears in the U.S. Patent and Trademark Office, patent file or records, but otherwise reserves all rights in its copyright whatsoever.

RELATED PATENT FILING

This patent specification has been filed concurrently with and is cross referenced to assignee's related patent specification Ser. No. 08/856,272, pending.

TECHNICAL FIELD

This invention relates to snooping in multiple processor systems and more particularly to a snooping method and apparatus including a new system architecture which reduces the number of snoop cycles and effectively increases the available processor bus bandwidth.

BACKGROUND OF THE INVENTION

The limiting performance factor in most multiple processor systems is processor bus bandwidth. Since most multiple processor systems use processor caches, a significant percentage of the processor bus bandwidth is consumed in performing snoops of these caches during I/O operations. These snoop operations have a negative effect on overall system performance since they require a significant portion of the processor bus bandwidth.

Snoops are used during I/O operation to determine, by means of a controller, if the most recent copy in memory of a data item also resides in a processor cache. Systems which snoop, do so on a processor cache-line basis. To snoop a 4K byte page, in a system which has a 16 byte cache line, requires 256 snoop cycles. In systems that snoop, it is also required that the I/O and processor buses be synchronized for each of the snoop cycles. Consider the following, regarding the mechanism referred to as synchronization. In the example of a computer system with two busses, i.e., the processor bus and the I/O bus, if there is no transfer of information from one bus to the other bus then these busses can run independently of each other. However, if and when information is to be transferred from one bus to the other bus, then a mechanism must be created to allow this transfer and this can be done through synchronization. Synchronization can be implemented a number of ways and the following are two which are typical.

In a first example, the busses are run in lock step. This allows the transfer of information to occur at anytime. There are a number of disadvantages to the lock step design. The key being that as processor busses become faster, due to improvement in processor technology, this improvement may not be implemented or taken advantage of because of the requirement that the processor bus be synchronized (run at the same speed or at a multiple (2x, 3x, etc.) speed) to the I/O bus. A second typical example is of a latch interface. This is a storage device that is placed between the two busses. When data is to be transferred, one bus places the data into the latch and signals the other bus. The other bus then can access the storage device and signals the first bus that it has accessed the information. This need for synchronization can detrimentally lengthen the time required for the snoops, thereby increasing the load that snooping places on the multiple processor bus bandwidth.

One possible way of eliminating the snoop cycles on the processor bus would be to use processor caches which are store-thru. Unfortunately any bandwidth saved by eliminating the snoops, would be more than lost by the increase write-to-memory traffic. Therefore such a solution is not practicable and is not readily useful for multiple processor designs.

Store-thru, also called write-through strategy, provides for all memory writes from the microprocessor to be passed along immediately by a cache controller to also update the main system memory. The result is that the main system memory always contains valid data. Any location in the cache can be overwritten, i.e., updated, immediately without data loss. Further discussion of other related cache operations, upon which the specification relies, can be found in a booklet entitled "Cache Tutorial" available from Intel Corporation, Literature Sales, Mt. Prospect, Ill. The booklet is dated 1991 and the order number is 296543-002.

It would be advantageous to provide for snooping in a more efficient manner particularly for multiple processor systems without hindering access to the bus and unduly limiting bus bandwidth.

SUMMARY OF THE INVENTION

This invention introduces a system architecture which supports the concept of block snoops. Block snoops make the cache snooping operations more efficient by reducing the amount of traffic on the multiple processor bus. This in turn improves performance as well as increases the number of processors which can be supported at a reasonable level of performance, with a given bus design.

Significant features of the disclosed invention include, a bus interface unit or BIU which attaches between the caches of the processors and the multiple processor bus, and which includes two block snoop control registers. There is contemplated a BIU for each processor/cache subsystem; two unique signals which interface between the BIUs and the system memory controller; enhanced function within the memory controller to support not only I/O devices which support the block snooping function, but also other I/O devices which do not support the new block snooping function, which can be characterized as more vintage type I/O devices; and the use of a snoop table within the system memory controller to indicate which address of the physical memory can be safely transferred to I/O without the need for snooping during I/O operations.

Since this innovation introduces a new architecture, there is a software impact to its implementation. However, the impact is minimal and can be contained to just a set of device drivers and any busmaster I/O adapters which are set to implement this new function. The contemplated architecture is also backward compatible and busmaster devices which do not use or anticipate this function can still be used within a system which incorporates the invention.

The BIU which exists for each of the processor complexes, which complexes are connected to the multiple processor bus, is prepared with the following functions. There exists an interface to the processor complex, a start snoop address register, a block size register, a control logic to manage and control the block snooping function, including the two unique signals and also an interface to the multiple processor bus.

The uniqueness of the BIU allows the multiple processor bus to be processor independent. Therefore the concepts of the architecture of this invention can be applied to both x86 (Intel Corporation series processors and their compatibles) as well as RISC (reduced instruction set computing) processors. The BIUs interface to the memory controller through the multiple processor bus and the two unique signals. These two new signals comprise a signal from the BIU to the memory controller to indicate that the block snoop for this processor complex is completed, and a signal from the memory controller to all the BIUs indicating that each BIU should reset its respective start snoop address, register and block size register.

In addition with the present innovation there is no need to synchronize the busses. The present invention provides that when a block of data is to be moved between memory and an I/O device, wherein the address and number of bytes to be transferred are known, the system broadcasts on the processor bus this information to the processors, including the address and number of bytes. At each processor is provided a BIU which will independently generate a sequence of addresses causing the cache within the processor to be snooped. Depending on the result of each snoop operation, the caches will do one of three things. Under conditions where there is no match, the cache does nothing. Otherwise, where there is a match and the cache was not modified since the last time it received it, the cache invalidates the data in the cache. To invalidate is to mark the data in the cache and indicate that if this data is needed the processor will have to go to memory and get the data in its most current state. The third possibility is that there is a match, but that however, the cache was modified since the time it was received. In this instance, the cache will write the data out to memory, since this data is the most up-to-date copy of data, and then invalidate the data in the cache. Once this operation is completed, the BIU signals that the block has been snooped. Once all the BIUs report and the total process is completed, the system allows the I/O transfer between the memory and the I/O to occur. Note that since the actual I/O transfer occurs after the snoop operation on the processor bus, there is no need to synchronize the two busses and in this manner a significant feature of the present inventive contribution is achieved, i.e., nonsynchronous block snooping. Synchronization would be needed for operations where the busses are working concurrently. In the present invention, the busses, do not work concurrently but rather, first the processor bus is active then the I/O bus is active.

BRIEF DESCRIPTION OF THE DRAWINGS

The invention is pointed out with particularity in the appended claims. The stated advantages of the invention may be better understood by referring to the following detailed description in the specification in conjunction with the drawings in which:

DETAILED DESCRIPTION OF THE PREFERRED EMBODIMENT(S)

Figure 1:
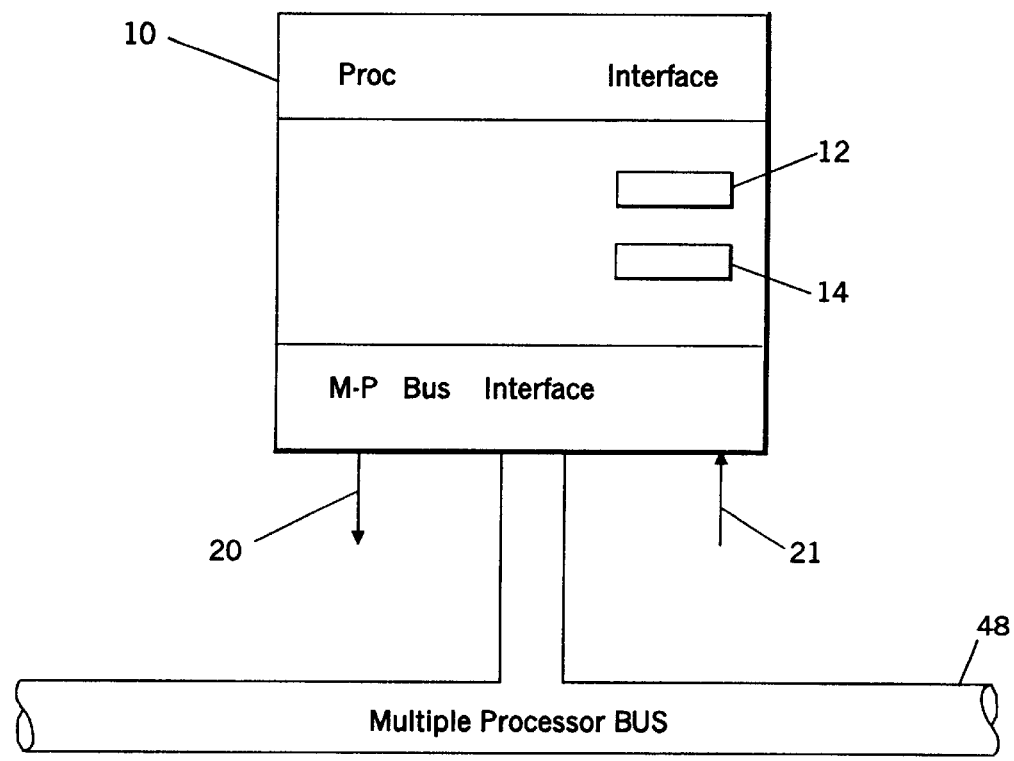
FIG. 1 is a schematic diagram of the bus interface unit subsystem according to the principles of the present invention.

FIG. 1 shows a general overview of a bus interface unit (BIU) 10, which includes the features of the block start address register 12 and the block size register 14. These registers 12 and 14 are used in the performance of the block snoop operation. The meaning of block, when used in the context of storage and block snooping, refers to a collection of consecutive bytes of data that, as a group, are read-from or written-to storage. When a block snoop operation is to be performed, the block start address register 12 is loaded with the starting address of the area of physical storage that is to be snooped. The block size register 14 is loaded with the number of bytes of storage which are to be snooped.

In the preferred implementation, each loading of the block size register 14 automatically causes the BIU, as typically illustrated by BIU 10, to start the block snoop operation. The respective BIU 10 will issue snoops to each respective cache starting at the address contained in its block start address register 12. The BIU 10 will increment the block start address register 12 and decrement the block size register 14 by the number of bytes contained in a processor cache line. (i.e., the BIU 10 will issue one snoop per cache line.) The block snoop of the BIU 10 is completed when the contents of the block size register 14 is zero. If during the block snoop, a cache castout occurs the BIU 10 will send the castout to the memory controller 43 on multi processor bus 48.

Cache castout is existent and contemplated in the following manner. When a cache is a store-in (write-back), the cache may contain the most up-to-date copy of data. When the processor writes to a memory location and that location is found in the cache, the copy in the cache is updated but the update, at the time the write occurs, is not written out to memory. This creates a recognized condition referred to as dirty data. It is expected that there will come a time when the dirty data will be written out to memory. This can be due to two events. In the first event, since a cache is a mapping of memory, there is the possibility that the cache will want to use the location in cache to store a different address, and in this event, since the cache has the most up to date copy of the current data, the cache will write the data out to memory.

In the second event, a snoop of this address occurs. When this address is snooped it is discoverable that this cache has the most up to date copy of the data. Again the cache will write the data out to memory. The occurrence of the writing out of data, is referred to as a cache castout.

Figure 2:
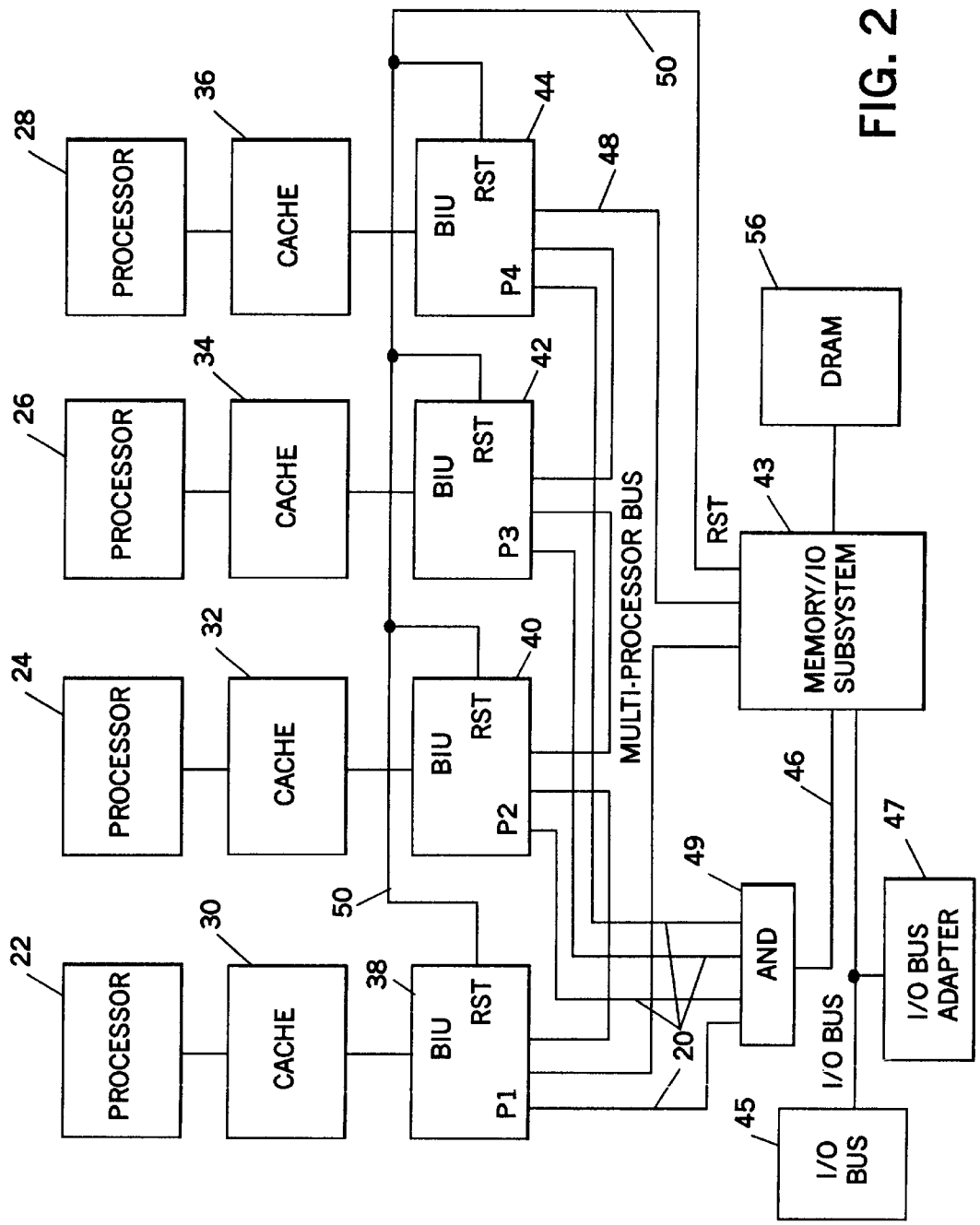
FIG. 2 is a schematic block diagram of a multiple processor system depicting the logical system structure and the control signal paths according to the principles of the presentation.

The BIU 10 also supports the two mentioned unique signals. The first signal is used by the BIU 10 to indicate to the memory/IO controller subsystem 43, as seen in FIG. 2, that the typical BIU 10 in FIG. 1 and each of the exemplary BIUs 38, 40, 42 and 44 in FIG. 2, has completed a block snoop. The second signal 21, or as seen in FIG. 2 as line 50, from the memory controller 43, is used by the memory/IO unit 43 to tell the respective exemplary BIU 10 to reset its block snoop complete signal. This architecture operational within the controller 43 has the added benefit of eliminating the need for the processor bus 48 and I/O buss 46 to be synchronized for the snoop operations.

FIG. 2 illustrates an exemplary system layout of the system with multiple exemplary processors 22, 24, 26 and 28, multiple exemplary cache units, 30, 32, 34 and 36 and the corresponding multiple BIUs 38, 40, 42 and 44, according to the principles of this invention. The memory/IO subsystem 43 may be composed of multiple memory and IO subsystems. However, this is transparent to the user. The memory/IO subsystem 43 determines whether a request from any of the processors 22, 24, 26 or 28 is to physical storage (cachable memory 30, 32, 34 or 36) or is directed to an, exemplary, I/O device 45 on the I/O bus 46. It is obvious that a plurality of I/O devices can be present.

This implementation supports only one outstanding block snoop at a time, i.e., a block snoop must be completed before another block snoop can be initiated. This implementation is chosen for its simplification. It should be appreciated that alternative implementations which support multiple outstanding block snoop operations are not precluded.

Figure 4:
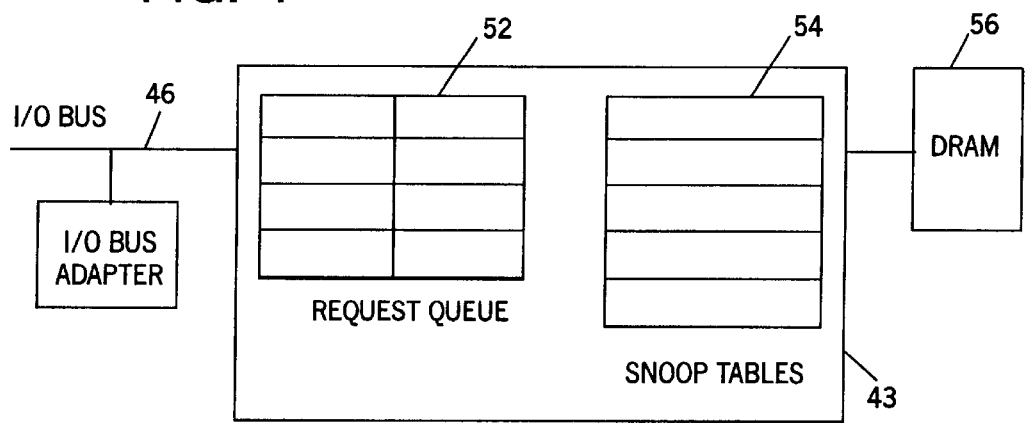
FIG. 4 illustrates the logical structure of the memory controller according to the principles of the present invention.

Since there are multiple I/O devices contemplated, is it possible that there can be multiple I/O operations that occur concurrently. Using the present invention, as the requests to perform I/O are received they are queued up in the request queue. As the requests are serviced, the snoop tables, as illustrated in FIG. 4, are checked to see if a snoop is required. If the snoop is needed, that snoop operation is executed. Otherwise the I/O operation is simply allowed to execute. As described herein, the I/O operation involves the device I/O bus and the memory. Since the snoop is completed before the I/O transfer, the processor bus and I/O do not need to be synchronized, as is noted herein.

Figure 3:
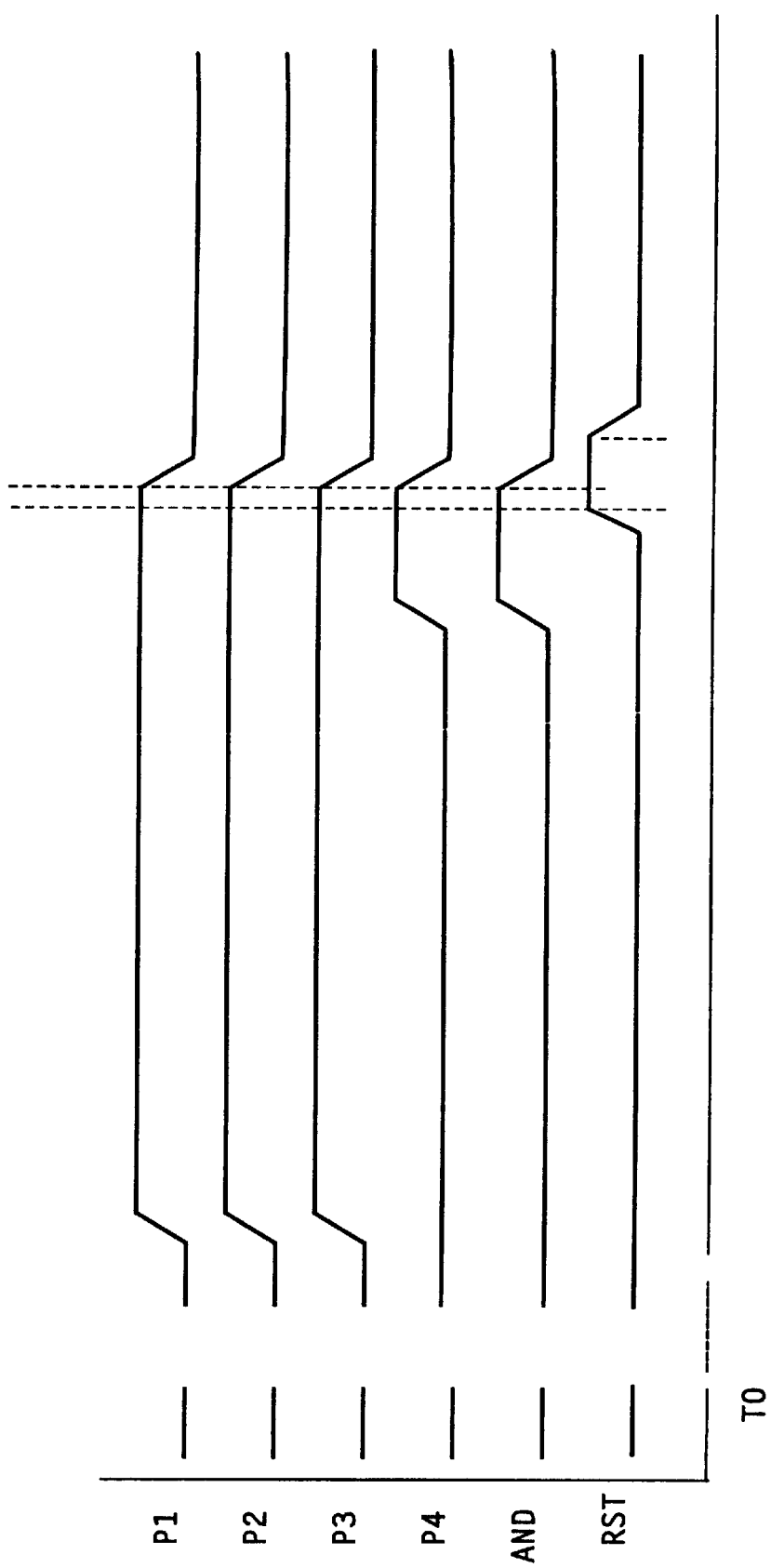
FIG. 3 is a bus signal timing diagram of control signals during a block snoop operation according to the principles of the present invention.

FIG. 3 illustrates the timing of the control signals during a block snoop operation. At some time TO, on the X axis of FIG. 3, a block snoop is initiated. The block address and block size are broadcasted to all BIUs 10 and the multiple processor bus 48 is released. The BIUs 10 will then each independently issue a series of snoop cycles to their associated processors and caches, as best seen in FIG. 2. If any cache castouts are generated they are sent to the memory controller 43 on line 20. When all signals are set, as shown by the elevated signal level on each of the exemplary P1, P2, P3 and P4 lines corresponding to the output terminals in FIG. 2, the AND unit 49 of FIG. 2 goes high and the memory controller 43 knows that the snooping operation is complete and the memory controller 43 pulses the reset (RST) line 50, from the signal on line 21, which causes all the exemplary BIUs 38, 40, 42, and 44 to reset their signals to the memory controller 43. This reset is illustrated by the lowering of the signal level on each of the P1, P2, P3 and P4 lines at the same time on the X axis of FIG. 3. Once reset is issued the system is ready for another block snoop operation. Any time differential between the pulse of the reset signal and the reset of each P line is typically due to propagation delay.

FIG. 4 illustrates the logical structure of the memory controller 43. This memory controller 43 illustrates unique functions and includes a request queue 52 and snoop tables 54. The snoop tables 54 indicate which addresses can be safely transferred to/from an IO device, such as I/O device 45, without snooping while the transfer is occurring. The snoop table 54 contains an entry for each 4K byte page of cacheable memory 30, 32, 34 and 36. This entry is a single bit. For a system with 64 Mbytes of physical storage, a snoop table of 2K bytes is required. When a block snoop operation is completed for a given page, the snoop table 54 marks the page as snooped. Whenever one of the processors 22, 24, 26 or 28 does a read or a write operation which goes to memory 56, the page of memory on which that data is contained is marked as not-snooped in the snoop table 54.

When an I/O device 45 wishes to issue a I/O operation it passes the I/O starting address and the number of bytes to transfer, to the memory control unit 43. This information is placed in the snoop request queue 52. When the request is at the top of the queue 52 it is compared against the snoop table 54 . If the address of the requested memory is listed in the snoop table 54 than that area of memory 56 does not need to be snooped. If the area is listed in the snoop table 54 , the I/O device 45 is informed that it is free to execute its I/O operation. The I/O operation is also free to execute at the rated speed of the I/O bus 46. If on the other hand the address of the requested memory is not listed in the snoop tables 54, then that area must be snooped. The memory control unit 43 then executes a block snoop operation as described.

As each of the BIU complexes completes its snoop operation, it sets its signal, as shown in FIG. 3. When all have completed their snoops the memory controller 43 tells all the BIUs 38, 40, 42 and 44 to reset. At this time the I/O device 45 is informed that it is free to execute its I/O operation. The I/O operation is also free to execute at the rated speed of the I/O bus.

Further, with regard to system initialization of the snoop tables, the following provides additional explanation of the procedures contemplated and followed in the present inventive method. The snoop tables can be viewed, or considered, as a map of main memory. This map indicates that if an I/O operation occurs to a specific address in main memory then that address may not need to be snooped for a number of reasons. Possibly the area is non-cacheable memory. Normally the system allow parts of memory to be defined as non-cacheable. In this case, when a processor accesses this address, it will not place the data in caches and since the data is never in the cache it does not have to be snooped. Another alternative, is that the area has been snooped. This is set when the present invention is used. All other areas of memory are marked as, needs-to-be snooped. When the system is first initialized, this table is set. Defining non-cacheable memory is currently part of system bring up. All other memory (cacheable) is marked as needs-to-be snooped.

The following is the sequence of operations that occur;
/* The follow are the operations executed by the memory controller */
Memory controller selects requests from queue
Memory controller compares the address against the snoop table
IF required area of storage is snooped
   THEN signal I/O device to perform I/O transfer operation
   ELSE /* Required area of storage has not been snooped */
    Do
      Perform a block snoop of required area of storage
      When snoop operation completed then signal I/O device to perform I/O transfer operation
    END
/* NOTE WHILE THE I/O TRANSFER OPERATION is going on, the memory controller can snoop another block */
/* The follow are the operations executed by the I/O adapter */
I/O device issues a request to execute a block I/O operation.
I/O device passes the start address and number of bytes to memory controller
Request is placed into request queue
While request not granted wait
When request granted perform I/O TRANSFER OPERATION For I/O devices 45 which do not support the use of the block snoop architecture, the system will simply handle the snoops on a cache line basis, as systems currently do. The system will also force the processor bus 48 and I/O busses, represented by exemplary I/O bus 46, to synchronize during the snoop operations. Therefore the system can support a mix of IO adapters which both anticipate and do not anticipate the present invention.

Although the present invention and its advantages have been described in detail, it should be understood that various changes, substitutions and alterations can be made herein without departing from the spirit and scope of the invention as defined by the appended claims.

What is claimed is:

1. A computer system, comprising:

a multitude of independent microprocessing units;

a multiprocessor bus;

a multitude of cache storage units, each cache storage unit of the multitude of cache storage units coupled to one of the multitude of microprocessing units;

a multitude of bus interface units (BIUs), each BIU of the multitude of BIUs coupling each respective microprocessing unit through each respective cache storage unit to the multiprocessor bus;

an I/O bus for coupling to I/O devices; and a memory controller coupled to the multiprocessor bus and the I/O bus for processing requests from any one of the multitude of independent microprocessing units for determining which addresses forming a block having a plurality of cache lines need to be snooped and for implementing a cache storage unit block snoop operation for the block when a determination is made that an address needs to be snooped and, alternatively, an I/O operation when a determination is made that the address does not need to be snooped.

2. The computer system as defined in claim 1, wherein each BIU of the multitude of BIUs generates a block snoop completed signal for informing the memory controller that each respective cache storage unit corresponding to each BIU has been snooped.

3. The computer system as defined in claim 2, wherein the block snoop completed signal from each BIU of the multitude of BIUs provides status relative to a completion of a system snoop and the memory controller generates a reset signal which is received by each respective BIU for each respective BIU to reset for a subsequent block snoop.

4. A nonsynchronous block snooping system, comprising:

a multitude of independent microprocessing units;

a multiprocessor bus;

a multitude of cache storage units, each cache storage unit of the multitude of cache storage units coupled to one of the multitude of microprocessing units;

a multitude of bus interface units (BIUs), each BIU of the multitude of BIUs coupling each respective microprocessing unit through each respective cache storage unit to the multiprocessor bus;

an I/O bus for coupling to I/O devices; and a memory controller coupled to the multiprocessor bus and the I/O bus for processing requests from any one of the multitude of independent microprocessing units for determining which addresses having a plurality of cache lines need to be snooped and for implementing a cache storage unit block snoop operation before an I/O transfer to any I/O device when a determination is made that an address needs to be snooped and, alternatively, an I/O operation when a determination is made that the address does not need to be snooped.

5. A method of block snooping in a computer system including a multitude of independent microprocessing units, a multiprocessor bus, a multitude of cache storage units, each cache storage unit of the multitude of cache storage units coupled to one of the multitude of microprocessing units, a multitude of bus interface units (BIUs), each BIU of the multitude of BIUs coupling each respective microprocessing unit through each respective cache storage unit to the multiprocessor bus, an I/O bus for coupling to I/O devices and a memory controller coupled to the multiprocessor bus and the I/O bus for processing I/O requests from any one of the multitude of independent microprocessing units, comprising the steps of:

receiving an I/O request from one of the multitude of independent microprocessing units;

determining which cache storage unit addresses need to be snooped;

implementing a cache storage unit block snoop operation when a determination is made that an address having a plurality of cache lines needs to be snooped by loading a block start register in each BIU with the cache storage unit address determined to be snooped and loading a block size register in each BIU with the size of the block to be snooped;

snooping each cache storage unit; and transferring data requested by the one of the multitude of independent microprocessing units.

6. The method of block snooping as defined in claim 5, further including the step of resetting each BIU after all of the BIUs have completed the block snooping operation.

* * * * *